(12) United States Patent
Sinatov

(10) Patent No.: US 10,571,188 B2
(45) Date of Patent: Feb. 25, 2020

(54) METHOD FOR THERMALLY ASSISTED ELECTRIC ENERGY STORAGE

(71) Applicant: Stanislav Sinatov, Kiryat-Ono (IL)

(72) Inventor: Stanislav Sinatov, Kiryat-Ono (IL)

( * ) Notice: Subject to any disclaimer, the term of this patent is extended or adjusted under 35 U.S.C. 154(b) by 131 days.

(21) Appl. No.: 15/863,038

(22) Filed: Jan. 5, 2018

(65) Prior Publication Data

US 2018/0187971 A1 Jul. 5, 2018

Related U.S. Application Data

(60) Provisional application No. 62/442,457, filed on Jan. 5, 2017.

(51) Int. Cl.
*F25J 1/02* (2006.01)
*F25J 1/00* (2006.01)
*F02C 6/16* (2006.01)

(52) U.S. Cl.
CPC .......... *F25J 1/0251* (2013.01); *F25J 1/0012* (2013.01); *F25J 1/0287* (2013.01); *F25J 1/0288* (2013.01); *F02C 6/16* (2013.01); *F25J 2210/40* (2013.01); *F25J 2230/04* (2013.01); *F25J 2230/40* (2013.01); *F25J 2240/10* (2013.01); *F25J 2270/04* (2013.01)

(58) Field of Classification Search
CPC ........ F25J 1/0251; F25J 1/0037; F25J 1/0285; F25J 1/0281; F25J 1/0242; F25J 1/0228; F25J 1/0202; F25J 1/0042; F25J 1/004; F25J 1/0288; F25J 1/0287; F25J 1/0012; F25J 2240/90; F25J 2230/40; F25J 2230/04; F25J 2210/40; F25J 2240/10; F25J 2270/04; F02C 6/14; F02C 6/16; F05D 2220/60; Y02E 60/15

See application file for complete search history.

(56) References Cited

U.S. PATENT DOCUMENTS

| | | | | |
|---|---|---|---|---|
| 6,381,973 | B1 * | 5/2002 | Bhatti | B60H 1/00007 62/172 |
| 9,217,423 | B2 * | 12/2015 | Chen | F03G 7/06 |
| 9,638,068 | B2 * | 5/2017 | Sinatov | F01K 27/00 |
| 2017/0016577 | A1 * | 1/2017 | Sinatov | F01K 3/12 |
| 2017/0191752 | A1 * | 7/2017 | Castelucci | F25J 1/0012 |
| 2018/0066888 | A1 * | 3/2018 | Sinatov | F02C 6/04 |

(Continued)

FOREIGN PATENT DOCUMENTS

| | | | | |
|---|---|---|---|---|
| GB | 2534914 A | * | 8/2016 | F02C 6/16 |
| GB | 2537125 A | * | 10/2016 | F02C 6/14 |

(Continued)

*Primary Examiner* — Michael C Zarroli

(57) ABSTRACT

A proposed method for thermally assisted electric energy storage is intended for increase in round-trip efficiency through recovery of waste heat energy streams from the co-located power generation and industrial facilities, combustion of renewable or fossil fuels, or harnessing the renewable energy sources. In the charge operation mode, it is achieved by superheating and expansion of recirculating air stream in the liquid air energy storage with self-producing a part of power required for air liquefaction. In the discharge operation mode, it is attained through the repeated use of a stream of discharged air for production of an additional power in auxiliary discharge cycle.

5 Claims, 13 Drawing Sheets

(56) References Cited

U.S. PATENT DOCUMENTS

| | | | | |
|---|---|---|---|---|
| 2018/0073802 A1* | 3/2018 | Sinatov | ................... | F02C 6/16 |
| 2018/0094550 A1* | 4/2018 | Conlon | ................... | F02C 7/16 |
| 2018/0221807 A1* | 8/2018 | Sinatov | ................. | F25J 1/0012 |
| 2019/0063265 A1* | 2/2019 | Sinatov | ................. | F01K 27/02 |
| 2019/0063685 A1* | 2/2019 | Sinatov | ................... | F17C 9/04 |
| 2019/0072007 A1* | 3/2019 | Sinatov | ................. | F01K 27/00 |

FOREIGN PATENT DOCUMENTS

| | | | | |
|---|---|---|---|---|
| GB | 2537126 A * | 10/2016 | ............... | F02C 6/14 |
| WO | WO-2018128803 A1 * | 7/2018 | ............... | F02C 1/00 |

* cited by examiner

METHOD FOR THERMALLY ASSISTED ELECTRIC ENERGY STORAGE

CROSS-REFERENCE TO RELATED APPLICATIONS

This application claims the benefits of U.S. Provisional Application No. 62/442,457 filed on Jan. 5, 2017.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF INVENTION

The present invention relates to the field of energy conversion technique, and more specifically to the methods enabling an improvement in the technologies intended for conversion and storage of excessive electrical energy. It further relates to the methods making possible to profitably integrate the electrical energy storage with any co-located source of thermal energy at an elevated temperature, resulting in a significant enhancement of the power output and Round Trip Efficiency (RTE) of such thermally assisted electric energy storage (TAEES).

BACKGROUND OF THE INVENTION

A planned and started transfer to the decarbonized power grids is based first of all on a significant increase in a share of non-fossil and renewable (mainly wind and solar) energy sources in global electricity generation. According to the Blue Map scenario of "Prospects for Large-Scale Energy Storage in Decarbonized Power Grids", Working Paper, IEA 2009, contribution of 'green" power in total energy balance should grow up to 11-12% by 2050. However with the large shares of renewable energy, it may be desirable to take steps to ensure the on-demand and reliable supply of electricity, taking into account a variable output of the renewable energy sources and a frequent both positive and negative unbalance between this output and a current demand for power. One of the possible ways for solving this problem is the use of large-scale energy storages in the decarbonized power grids. According to the mentioned IEA estimates, an installed capacity of such energy storages should be increased from 100 GW in 2009 up to 189-305 GW by 2050. The large-scale energy storages could also solve a problem of operating the base-load (mainly coal and nuclear) power plants without significant reduction in the output of their steam generators during off-peak (low demand for power) hours in electrical grids.

Amongst the known methods for energy storage able to accumulate a lot of energy and store it over a long time-period, the methods for Liquid Air Energy Storage (LAES) (see e.c. Patent FR 2,489,411) are distinguished by a much simpler permitting process and the freedom from any geographical, land and environmental constraints, inherent in such other methods for large-scale energy storage technologies as Pumped Hydro Electrical Storage (PHES) and Compressed Air Energy Storage (CAES). In such LAES systems liquid air is produced using excessive power from the grid, stored in the small volume tanks between the off-peak and on-peak hours and used as effective working medium in the periods of high power demand. One of the most important properties of any electric energy storage is its grid Round Trip Efficiency ($RTE_{GRID}$). When durations of energy storage charge and discharge are equal, the $RTE_{GRID}$ is defined as a simple relationship between a power produced and delivered to the grid during storage discharge ($W_{DCH}$, kW) and power consumed from the grid during storage charge ($W_{CH}$, kW), that is to say as $RTE_{GRID}=W_{DCH}/W_{CH}$. A power produced may be determined as $W_{DCH}=\omega_{DCH} \times G_{LA}$, where $\omega_{DCH}$—specific power produced by one ton of liquid air per hour (kW/(ton/h)) and $G_{LA}$—hourly flow-rate of liquid air (ton/h) during LAES charge and discharge. In its turn, a $G_{LA}$ value may be determined as $G_{LA}=W_{CH}/\omega_{CH}$, where $\omega_{CH}$—specific power consumed for production of 1 ton of liquid air per hour (kW/(ton/h)). It is evident that the values $G_{LA}$, $W_{DCH}$ and eventually RTE may be primarily increased through reduction in a $\omega_{CH}$ value. Below is analyzed this way for of the LAES RTE improvement.

The most simple one turbo expander-compressor based air liquefaction process which may be used in the LAES system compresses a mixture of feed and recirculating air to one pressure level, cools the compressed mixed air, and work expands a recirculating portion of it in one turbo expander to provide the refrigeration for another portion of air, which is liquefied. The cooling effect produced by this work expansion step is defined as auto-refrigeration. The remaining portion of the compressed gas is cooled in the heat exchanger against the recirculating air stream, reduced in pressure, and recovered as a liquid. A more detailed description of the one turbo expander-compressor based air liquefier is presented in the Patent Application No. DE 10,2012,104,416 and U.S. Pat. Nos. 5,836,173 and 6,230,518. From the latter description it is clear that air liquefaction ratio (ALR) in such liquefier does not exceed 12%, resulting in $\omega_{CH}$ value well above 500 kWh/ton and unacceptably low LAES RTE value.

The use of multiple turbo expander-compressors which operate over different temperature levels and different or the same pressure levels provides air auto-refrigeration at the most appropriate locations of the heat exchanger, reduces a power consumed by the compressor(s) and improves the efficiency of the air liquefaction process and RTE of the LAES as a whole. Two turbo expander-compressors based air liquefiers may be exemplified by the U.S. Pat. No. 4,778,497, DE 10,147,047 and US Patent Application Pub. No. 2015/0192065. As evident from the mentioned patent documents, two turbo expander-compressors based process provides an increase in ALR value up to 13.5-17.5% and specific power consumption in bulky process in the region of $\omega_{CH}$=400-450 kWh/ton. However, under these conditions a LAES RTE value remains significantly below those values inherent in the competitive energy storage technologies (PHES and CAES).

A further considerable decrease in power consumed in air liquefaction process simultaneously with simplification of this process may be achieved through co-location of the LAES and Liquefied Natural Gas (LNG) import (regasification) terminal. In this case a vast cold thermal energy potential of the regasified LNG could be profitable used for an effective cooling of compressed air, as it is proposed in the UK Patent Application No. GB 2,512,360 and U.S. Provisional Application Nos. 62/105,411, 62/267,433, 62/548,982 and 62/550,704. Our estimates show that replacement of two turbo expander-compressors scheme by LNG cold recovery may increase the ALR value up to 70-88%, whereas a specific power consumption may be reduced down to $\omega_{CH}$=110-190 kWh/ton. However, a possibility for co-location and integration of the LNG import terminal and LAES is of infrequent occurrence, resulting in some restrictions of this method applicability.

The other possible ways for improvement in LAES performance are based on extracting a cold thermal energy from the liquid air being re-gasified during LAES discharge, storing this energy in the cold storage and its recovery in the process of air liquefaction during LAES charge. Cold storage may provide all the LAES demands for refrigeration in the process of air liquefaction as described in the Patent Applications No. US 2012/0,216,520, US 2013/0,240,171, US 2015/0,192,330, US 2015/0,218,968, EP 2,930,318, as well as WO 2015/154,894 and U.S. provisional patent application No. 61/955,156. In these cases the ALR value at the stand-alone LAES facility with adiabatic compression of charging air may be increased up to 95%, whereas an energy consumption in the air liquefaction process may be reduced down to $\omega_{CH}$=160-170 kWh/ton. However, a great deal needs to be done before a workable and reliable cold storages with direct contact between a bed of solid thermal energy storing material and highly-pressurized charging and discharged air undergoing cyclic liquefaction and regasification in the wide range of the temperatures from cryogenic to atmospheric values will be designed. It is expected that this design will be distinguished by the enhanced mass and dimensions and restrictions on relationship between the pressures of charging and discharged air streams, while construction and operation of such storages should be conducted in accordance with the strong regulations. The use of liquid cold storing material with an indirect contact between it and treated air eliminates certain of the mentioned problems, but results in origination of the new problems, like a high cost of the used liquid material, its explosion and fire hazard and a need for an additional equipment (heat exchangers, pumps, tanks, piping, etc.) of such cold storage.

The attempts at improvement this situation led to development of the hybrid LAES schemes, wherein a part of cold capacity required for air liquefaction is provided through use of one or two turbo expander-compressor based air auto-refrigeration, whereas a rest of required cold is extracted from the cold storage (see UK Patent Application No. GB 2,494,400 and US Patent Applications No. 2011/0,132,032 and 2015/0,192,358, EU Patent Applications EP 2,880,268, EP 2,976,511 and EP 2,835,506). As compared to the two turbo expander-compressor based liquefiers such hybrid LAES provide an increase in LAES ALR value by 20-30 points up to 37-47% and make possible to reduce specific power consumption down to $\omega_{CH}$=200-240 kWh/ton. However the improvements in the hybrid LAES performance are leveled down by its enhanced complexity and first cost, which are particularly high when employing the integration of two turbo expander-compressor based liquefier and cold storage with indirect contact between the solid or liquid cold storing material and treated air.

By this means simultaneously with the ongoing attempts at further decrease in the $\omega_{CH}$ level, new approaches are called for increase in amount of liquefied air $G_{LA}$ and correspondingly in $W_{DCH}$ value without any increase in power $W_{CH}$ consumed from the grid or co-located power plant during LAES charge which may be limited for one reason or other. This is possible through co-location of the LAES facility with any source of thermal energy at an enhanced temperature and conversion of this energy $Q_{TH}$ into an additional compression power, used for increase in a $G_{LA}$ value at the LAES facility. The harnessing a local thermal energy in lieu of external electrical or mechanical energy for operation of the cryogenic refrigeration apparatus has been suggested in the U.S. Pat. No. 3,214,938. However the technical solution described in this patent is not applicable to design of the LAES facility for a number of reasons and above all owing to: a) in the analyzed solution production of cold and conversion of thermal energy into power are performed in two different closed loops, whereas in the LAES facility the deep air cooling and its liquefaction with possible harnessing a thermal energy should be performed in one open loop; b) there is a drastic difference in temperature drop of the refrigerant in the heat absorber of closed loop cryogenic refrigeration apparatus and of the process air in the open loop liquefier (44K and 204K); c) there is a crucial distinction in phase state of single phase gaseous refrigerant and liquefied/re-gasified air; and d) there is a significant difference in the technologies of one and two turbo expander-compressor based gas auto-refrigeration.

A method for two turbo expander-compressors based air auto-refrigeration and liquefaction, including the operation of both expanders at the same pressure drop and different temperature levels and exemplified by the U.S. Pat. No. 4,778,497, may be best adapted for recovery of thermal energy from any co-located source. However, such integration calls for introducing a number of the significant changes into such method aiming to simplify it and increase a round-trip efficiency.

In addition, a thermal energy of co-located external source may be profitable used also for increase in specific power ($\omega_{DCH}$) produced by the re-gasified air during the LAES discharge. Together with the mentioned increase in $G_{LA}$ value this makes possible to significantly increase an output power $W_{DCH}$ of the LAES and correspondingly enhance a RTE value of the latter. However this calls for development of the special means for more effective harnessing an available assistant thermal energy during LAES discharge.

Finally, there is a need for a further increase in the $W_{DCH}$ and RTE values of the LAES facility at the sacrifice of a more rational use of cold thermal energy released by the re-gasified process air stream. For these purposes the known principle of so-called "cold" and low energy-intensive compression of an additional air, as a working medium for the closed bottoming or main open power cycles is proposed to use in the Patent Applications No. US 2012/0151961 and US 2015/0192065. In both cycles the energy consumed in the process of "cold" compression of an additional air is reduced significantly, resulting in a greater amount of an additional power produced. However, both the mentioned technical proposals are distinguished by an enhanced complexity and the high first costs of an additional air production and usage. It is expedient to simplify a harnessing of cold thermal energy released by the re-gasified air stream in the LAES facility.

As a whole, the method for liquid air energy storage including one or two turbo expander-compressor based air auto-refrigeration and liquefaction with operation of both expanders at the same pressure drop and different temperature levels is selected as a subject for an innovative improvement in the present invention. Thereby, a harnessing of thermal energy from any external, but co-located source in the processes of the LAES charge and discharge is found to be an effective means for achievement of the invention's goals. In addition, a more rational method of harnessing a cold thermal energy released by the re-gasified air stream for a further increase in the $W_{DCH}$ and RTE values of the LAES facility should be developed.

SUMMARY OF THE INVENTION

In one or more embodiments, a proposed method for thermally assisted electric energy storage (TAEES) may comprise in combination: a) pressurizing a process air, as a sum of fresh and recirculating air streams, up to an intermediate pressure with use of mechanically or electrically driven intercooled compressor train consuming an external power during TAEES charge; b) succeeding TAEES operation using the principle of at least one turbo expander-compressor based open air auto-refrigeration cycle and including compressing the process air up to a top cycle pressure by the boost compressor, pre-cooling the entire process air, work-expanding the most part of pre-cooled process air down to a bottom cycle pressure and a corresponding its deep cooling, harnessing an expansion work for driving the said boost compressor, liquefying the rest of process air at a top cycle pressure and its expanding with a final cooling down to the bottom cycle pressure and temperature, separating the liquid and gaseous phases of the rest of process air, forming a recirculating air stream at a bottom cycle pressure as a mixture of the deeply-cooled most part of process air and a gaseous phase of the rest of process air, and further sequential using a cold thermal energy of recirculating air for liquefying the rest of process air and pre-cooling the entire process air; c) storing the liquid air between the TAEES charge and discharge; d) pumping the liquid air during TAEES discharge, its re-gasifying, further superheating at a sacrifice of an assistant thermal energy and expanding with producing the bulk of discharge power; and e) producing an additional discharge power with use of the assistant thermal energy and a cold thermal energy released during the liquid air re-gasifying.

The invented method may differ from the known those in that: a) a bottom pressure of said open air auto-refrigeration cycle may be selected at a level exceeding atmospheric pressure by 1-10 bar and preferably by 3-8 bar; b) a recirculating air escaping the pre-cooler of process air may be superheated with use of an assistant thermal energy delivered during TAEES charge in the amount of 100-300% of such energy delivered during TAEES discharge; c) a superheated recirculating air may be further expanded down to near-atmospheric pressure with self-producing a power used for driving a compressor train and decreasing the consumption of external charge power at least by 40%; and d) a said liquid air being pumped, re-gasified, heated and expanded in the main TAEES discharge cycle may be further and repeatedly used as a working medium for producing a said additional discharge power in the auxiliary TAEES discharge cycle.

The following features may be inherent also in the proposed method: a) an assistant thermal energy may comprise at least a waste heat stream delivered from the co-located power generation or industrial facilities at a temperature of heat carrier exceeding 300° C. and preferably above 500° C.; b) the said co-located power generation or industrial facilities may be selected from a group of facilities being operated during TAEES charge and discharge and exemplified but not limited by the simple cycle turbocharged reciprocating engine or gas turbine-based power plants, industrial heaters, furnaces, driers and other facilities with the gaseous and liquid waste heat streams, as well as by the concentrated solar power plants; c) a high temperature part of assistant thermal energy may be added to a said waste heat part, aiming to increase a temperature of waste heat carrier from its said moderate level up to a selected higher value not exceeding 1000° C.; and d) adding a high temperature part of assistant thermal energy to waste heat stream may be performed by deriving this energy from combustion of any available renewable or fossil fuels.

In one or more embodiments of the proposed method, the main TAEES discharge cycle may further comprise in combination: a) delivering a liquid air from a storage and its pumping up to top cycle pressure selected in the range between 60 and 200 barA; b) re-gasifying a liquid air through recovering a waste heat of main discharge cycle; c) further superheating a regasified air up to the temperature selected in the range between 500 and 600° C. with use of an assistant thermal energy delivered during TAEES discharge; d) a partial expanding the superheated regasified air down to an intermediate pressure selected in the range between 25 and 45 barA with producing a part of discharge power in the main TAEES discharge cycle; e) succeeding reheating a partially expanded regasified air with use of an assistant thermal energy delivered during TAEES discharge; f) a final expanding the reheated regasified air down to the near-atmospheric pressure with producing another part of discharge power in the main TAEES discharge cycle; and g) said recovering a waste heat of air escaping the second expansion stage for regasifying a liquid air delivered from the storage with corresponding recovering a cold thermal energy of liquid air being regasified for deep cooling a said expanded air.

In addition, a deeply cooled expanded air may by repeatedly used as a working medium for producing an extra power in the auxiliary TAEES discharge cycle. For these purposes the following processes may be used in combination: a) compressing a deeply cooled repeatedly used air up to a pressure selected in the range between 5 and 15 barA; b) preheating the compressed repeatedly used air through recovering a waste heat of auxiliary discharge cycle; c) further superheating the compressed repeatedly used air through recovering the rest of assistant thermal energy being used in the main discharge cycle; d) expanding the superheated repeatedly used air down to the near-atmospheric pressure with producing an additional discharge power of the auxiliary TAEES discharge cycle; and e) recovering a waste heat of expanded and exhausted repeatedly used air for the said preheating the compressed repeatedly used air.

Additional feature may include providing a designed amount of self-produced power in the TAEES charge cycle through selecting a number of the stages of intercooled compressor train and a number of the turbo expander-compressors in the open air auto-refrigeration cycle, as well as through selecting a bottom pressure of said cycle, flow-rate and a temperature of heat carrier delivering a said assistant thermal energy to the TAEES.

BRIEF DESCRIPTION OF THE DRAWINGS

Embodiments will hereinafter be described in detail below with reference to the accompanying drawings, wherein lie reference numerals represent like elements. The accompanying drawings have not necessarily been drawn to scale. Where applicable, some features may not be illustrated to assist in the description of underlying features.

DETAILED DESCRIPTION OF THE INVENTION

The practical realization of the proposed method for thermally assisted electric energy storage (TAEES) may be performed through the operational integration between the Liquid Air Energy Storage (LAES) facility and any co-located source of waste thermal energy at a moderate temperature of the available heat carrier exceeding 300° C. and preferably exceeding 500° C. In addition, a possible increase in temperature of waste heat carrier up to a higher value not exceeding however 1000° C. should be provided, if needed. A bottom value of the waste heat carrier is determined by a possibility to get at least a minimum profit from the use of TAEES instead of the LAES with conventional one or two expander-compressor based liquefier. A top value of carrier high temperature may be selected in such a way as to use a simple uncooled design of the turbines and expanders being installed at the TAEES facility and accordingly to significantly reduce their first cost. At the same time any increase in temperature of heat carrier at the TAEES inlet leads to a corresponding enhancement of expanders (turbines) inlet temperature. In its turn this results in increasing a power self-produced during TAEES charge and correspondingly in decreasing a rate of external power consumed by the compressor train from the grid. With the technical and economic feasibility of increasing a carrier temperature above 1100° C. a power self-produced during TAEES charge may be comparable to a charge power consumed by the compressor train and there is not a need for consuming even a part of such charge power from the grid.

In deciding on a source of thermal energy integrated with the TAEES, the preference should be given to the sources of waste or clean energy, such as exhaust gases of the simple cycle gas engine and gas turbine power plants, waste heat streams of the different industrial facilities and excessive solar thermal energy. A possible increase in temperature of heat carrier from a moderate up to a high value may be performed through combustion of any clean, preferably renewable fuel. A relationship between the quantities of thermal energy delivered into TAEES facility during its charge and discharge lies in the range from 3:1 to 1:1, depending on an inlet temperature of the supplied waste heat carrier, further enhancement of this temperature in one or both TAEES operation modes and a selected value of expander inlet temperature.

Figure 1:
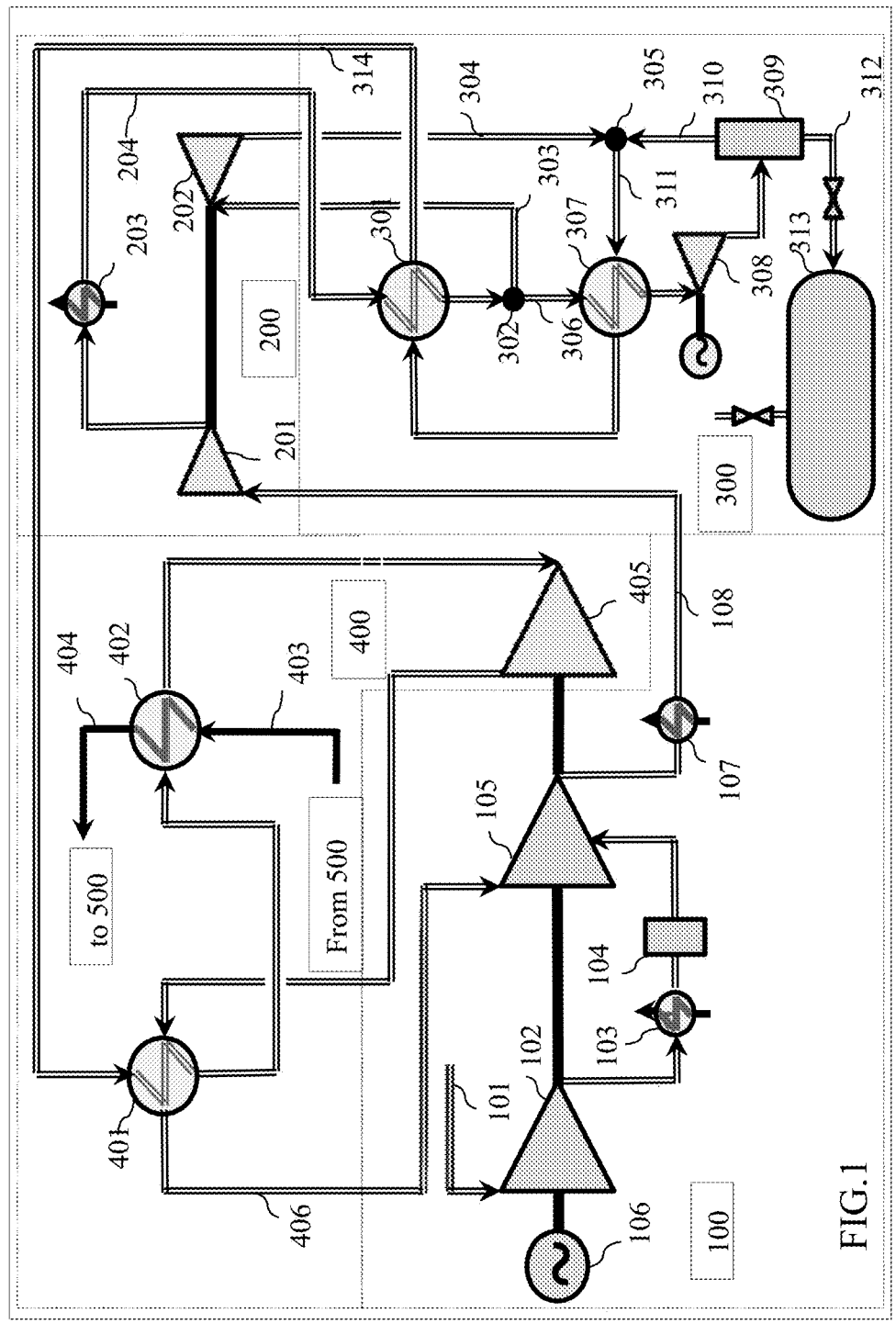
FIG. 1 is a schematic view of the first embodiment for implementing the invented method of the TAEES with one turbo expander-compressor based open air auto-refrigeration cycle used in the charge operation mode.

The schematic view of the first embodiment for implementing the invented method of the TAEES with one turbo expander-compressor based open air auto-refrigeration cycle used in the charge operation mode is presented in the FIG. 1 and includes the following equipment packages:

100—the air compressor train with associated equipment
    200—the one turbo expander-compressor train
    300—the liquefaction, separation and storage equipment package
    400—the recirculating air expander train
    500—the co-located source of assistant thermal energy with enhancer (if needed) of waste heat carrier temperature.

As shown in the FIG. 1, the first equipment package 100 integrates the equipment required for pressurizing a process air up to an intermediate pressure during TAEES charge with use of electrically driven compressor train. The second and third equipment packages 200 and 300 integrate the equipment required for performing one turbo expander-compressor based open air auto-refrigeration cycle, which provides liquefying and storing a part of process air and forming a recirculating rest of process air at a bottom cycle pressure. Finally, the fourth equipment package 400 integrates equipment harnessing an assistant thermal energy delivered from the co-located source 500 of this energy at a required moderate or higher temperature and self-producing a power inside of TAEES facility, resulting in reduction of external power consumed by the compressor train 100.

According to the proposed method, the charge of TAEES equipped with one turbo expander-compressor based open air auto-refrigeration cycle equipment is accomplished as follows. A stream of fresh air 101 from the atmosphere is compressed up to a selected low pressure at the first compressor stage 102, after-cooled in the cooler 103 and freeing from atmospheric moisture and carbon dioxide in the adsorber 104. The second compressor stage 105 provides first the after-cooled pressurizing of a recirculating air stream 406 incoming from the package 400 up to a said selected low pressure and then a further pressurizing of a process air, as a mixture of the fresh and recirculating air streams, up to an intermediate pressure. Compressor train is designed as at least two-stage compressor, wherein the first stage 102 and second stage 105 are driven by an electric motor 106. If needed, the second compression stage 105 may be designed in the intercooled configuration.

The process air stream 110 escaping the aftercooler 109 at a said intermediate pressure is supplied to the booster compressor 201 driven by the turbo expander 202. Here a process air is pressurized up to a top cycle pressure and after-cooled in the cooler 203. Then a process air stream 204 is directed to the pre-cooler 301, wherein its temperature is further decreased well below 0° C. At the outlet of deep cooler 301 (point 302) the process air stream is divided into two streams 303 and 306. The most air part 303 is expanding down to a bottom cycle pressure in the said turbo expander 202 with an accompanied deep cooling of expanded air stream 304. In its turn, the rest part 306 of process air is deeply cooled and fully liquefied at a top cycle pressure in the air liquefier 307. The liquefied rest of process air is further directed into a generator loaded turbine 308, wherein it is expanded down to a bottom cycle pressure with an accompanied final cooling of expanded air down to bottom cycle temperature. A bottom cycle pressure is selected at a level exceeding atmospheric pressure by 1-10 bar and preferably by 3-8 bar. An air separator 309 installed at the outlet of expander 308 is used to separate the liquid and gas phases of the finally expanded and cooled rest of process air. The liquid air stream 312 is directed to the pressurized liquid air vessel 313, wherein it is stored at the bottom cycle pressure and temperature between the TAEES charge and discharge. The gaseous air stream 310 is directed to the point 305, wherein its mixing with an expanded and deeply cooled greater part 304 of process air is performed. This results in formation of deeply cooled recirculating air stream 311 at a bottom cycle pressure. The said recirculating air stream 311 is further sequentially used first for the deep cooling and liquefying the rest part 306 of process air in the air liquefier 307 and then for said pre-cooling the process air stream in the pre-cooler 301. Heat exchange in the air liquefier 307 and pre-cooler 301 leads to a progressive heating of recirculating air and a temperature of outgoing recirculating air stream 314 above 0° C.

The said air stream 314 is further directed to the recirculating air expander package 400, wherein it is firstly preheated in the recuperator 401 and then finally heated up to a top cycle in the superheater 402. The superheating a recirculating air is performed at the sacrifice of a heat exchange with the stream 403 of heat carrier which is delivered from an external co-located source of thermal energy 500 at the required moderate or higher temperature and returned to the energy source 500 as the stream 404 at the reduced temperature. The superheated recirculating air stream is directed into a recirculating air expander 405, which is placed on the common shaft with the compressor stages 102 and 105 and electric motor 106. However, the recirculating air expander 405 may be designed as a separate turbomachinery and equipped with its own electric generator. In the recirculating air expander 405 the superheated air is expanded down to near atmospheric pressure with an accompanied partial cooling of the expanded air. A mechanical power self-produced by the recirculating air expander 405 reduces an amount of electric power consumed by the compressor train from the grid and leads to a decrease in required installed horsepower of the electric motor 106. Hypothetically, one can envision a situation at which a power self-produced by the expander 405 exceeds a power consumed by the compressor train, resulting in possibility for replacement of electric motor by a motor-generator. However, conversion of the TAEES facility into a system co-producing liquid air and power in charge operation mode is possible only with the availability and by fulfillment of a number of the mentioned above and other conditions. The finally expanded and partially cooled recirculating air stream is directed from the expander 405 to the recuperator 401, wherein the remainder of its hot thermal energy is used for the said preheating of the recirculating air stream 314 at the inlet of package 400. The described cycle is completed by delivering a recirculating air stream 406 at the near atmospheric pressure from the outlet of recuperator 401 to the inlet of the second compression stage 105.

The described method for charging the TAEES facility is applicable to its configurations both with one turbo expander-compressor open auto-refrigeration cycle, as outlined above, and with two turbo expander-compressor cycle (not shown in the drawing), as well as to the compressor train with a number of stages greater than two (not shown in the drawing). As this takes place, it should be stressed that an increase in number of the turbo expander-compressors installed and used stages of compressor train significantly decreases a power consumed for the charge of TAEES facility, but leads to a some increase in complexity and first cost of the charge equipment.

Figure 2:
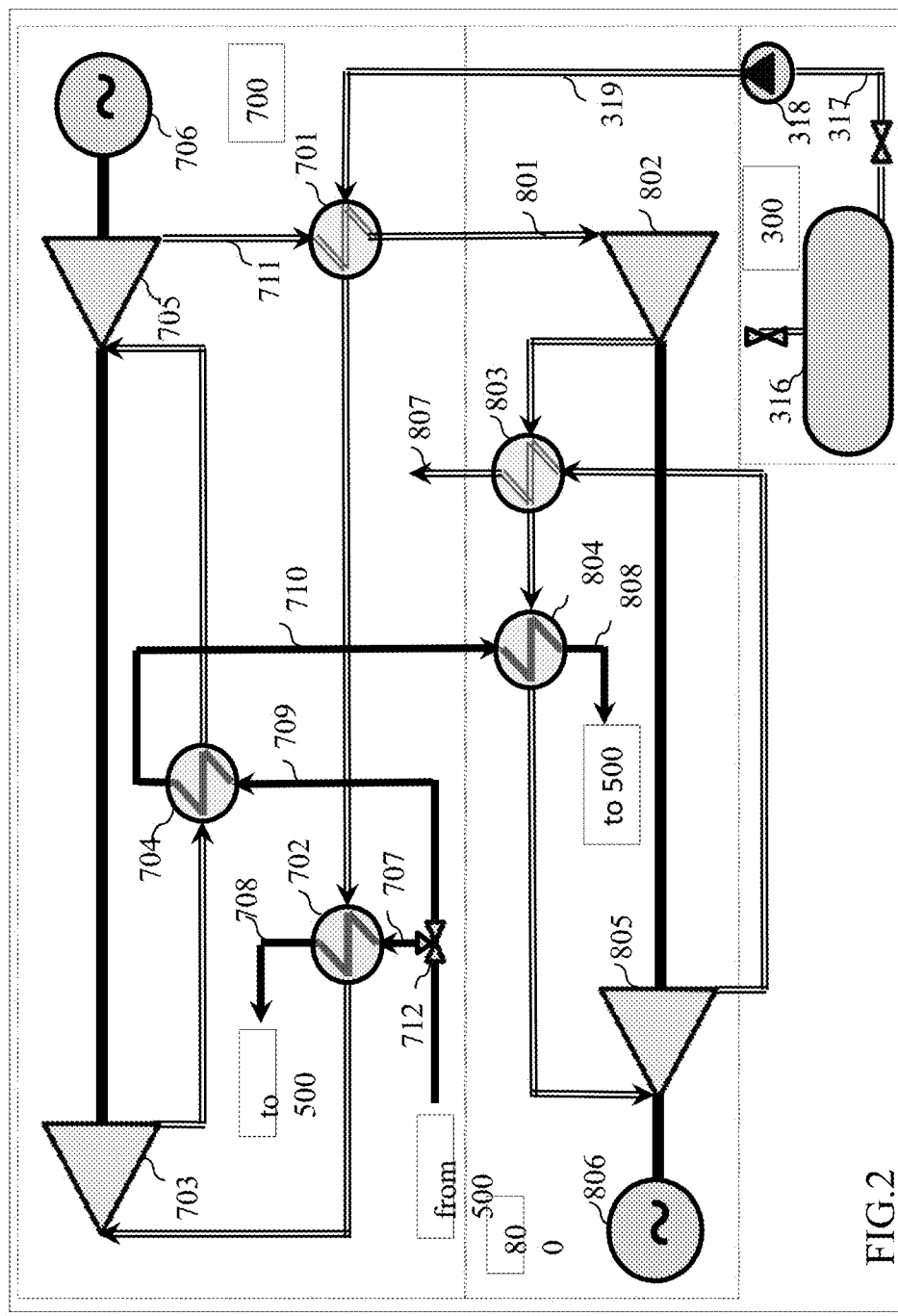
FIG. 2 is a schematic view of the second embodiment for implementing the invented method of the TAEES in discharge operation mode.
Figure 3:
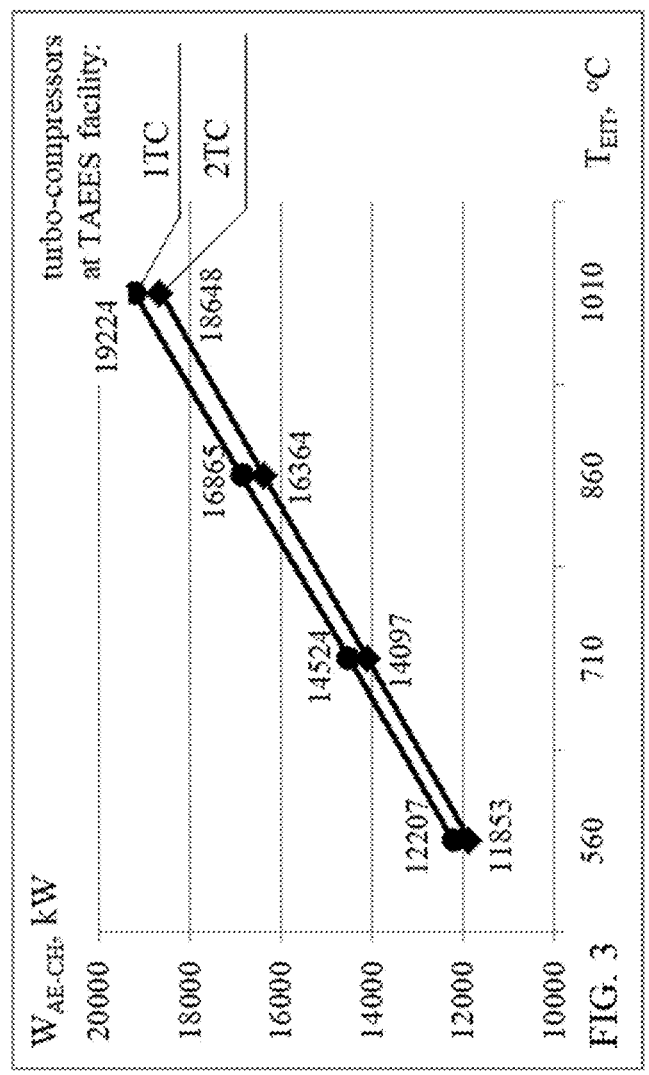
FIG. 3 is a diagram showing a relationship between a power self-produced by recirculating air expander, an expander inlet temperature and a number of turbo expander-compressors in auto-refrigeration cycle during TAEES charge.
Figure 4:
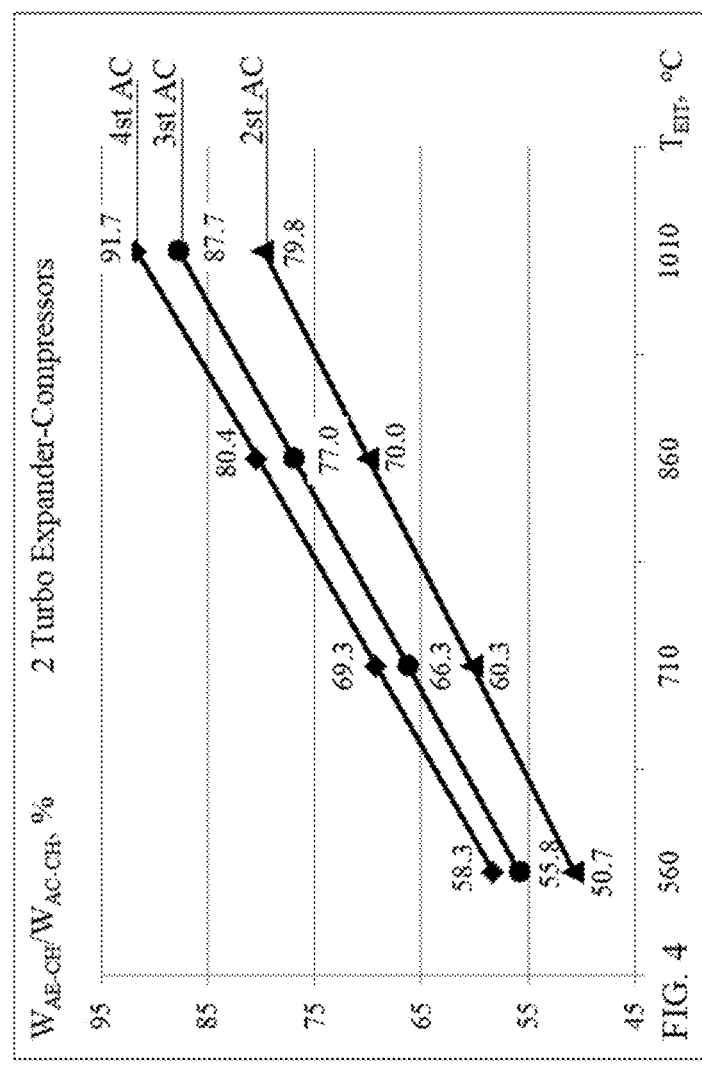
FIG. 4 is a diagram showing a relationship between a power self-produced by recirculating air expander and the external power consumed by compressor train with two turbo expander-compressor auto-refrigeration cycle vs. an expander inlet temperature and a number of train stages.
Figure 5:
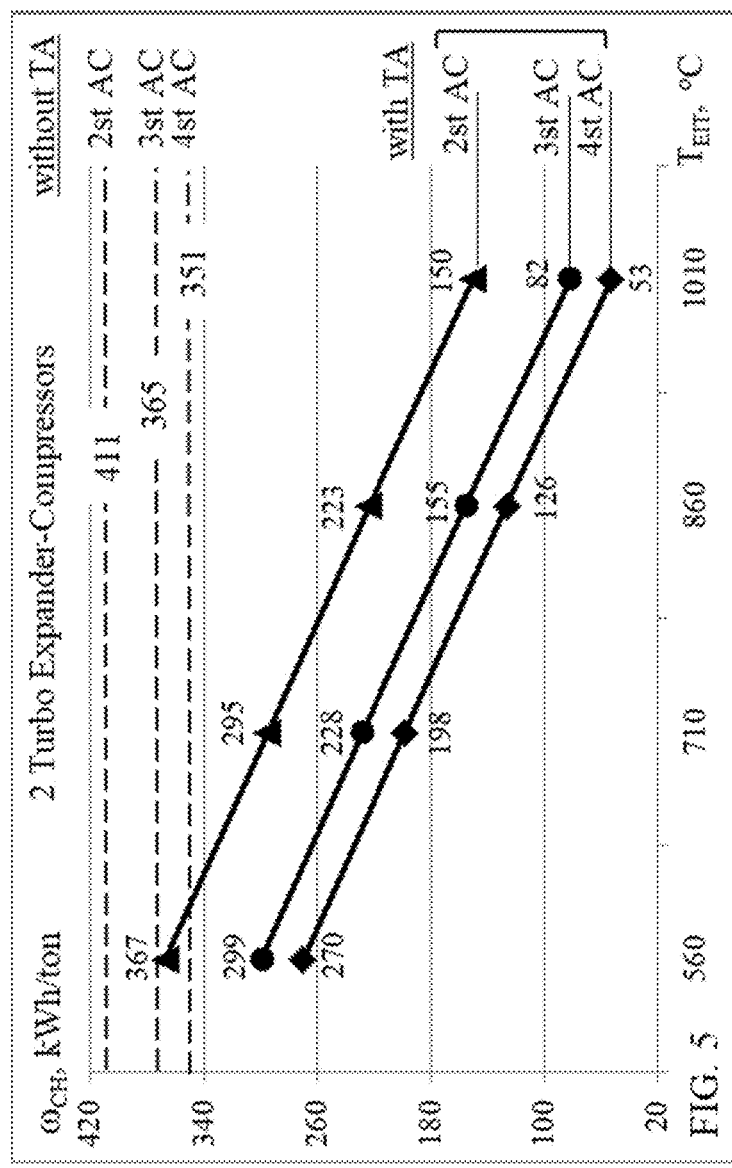
FIG. 5 is a diagram showing a relationship between a specific charge power consumed by the compressor train with two turbo expander-compressor auto-refrigeration cycle, an expander inlet temperature and a number of train stages.
Figure 6:
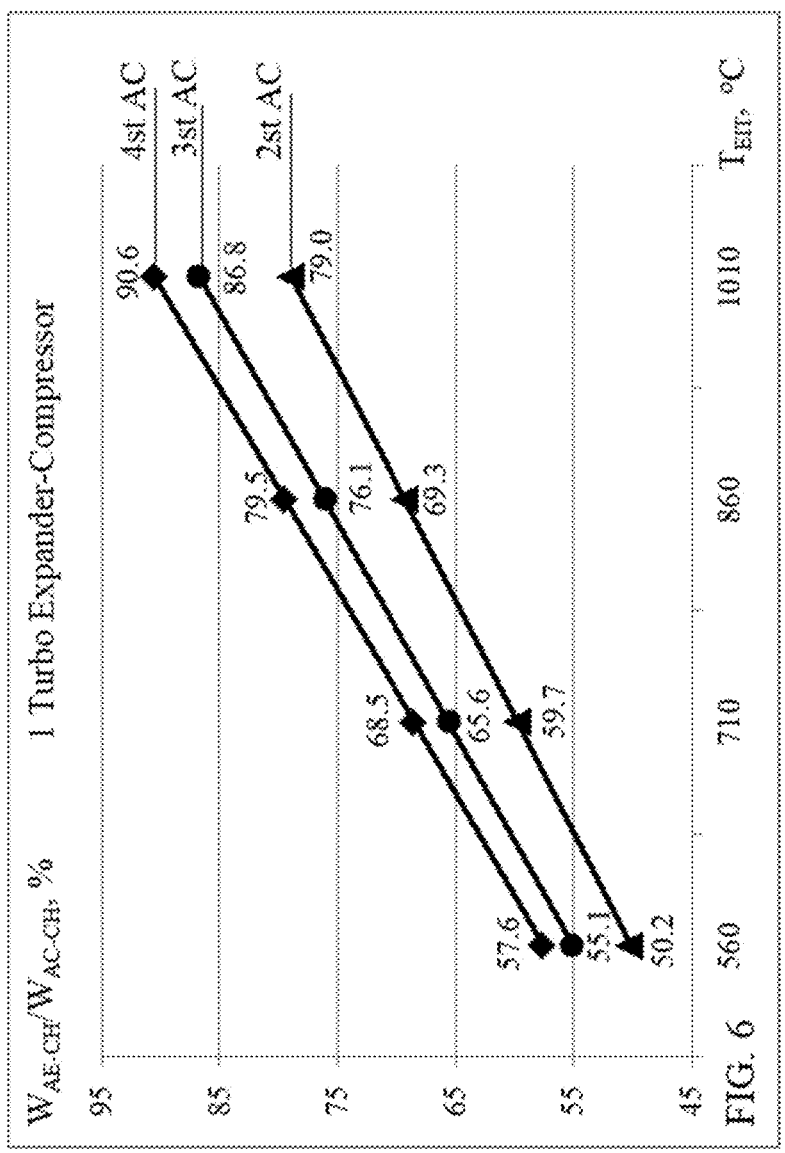
FIG. 6 is a diagram showing a relationship between a power self-produced by recirculating air expander and the external power consumed by compressor train with one turbo expander-compressor auto-refrigeration cycle vs. an expander inlet temperature and a number of train stages.
Figure 7:
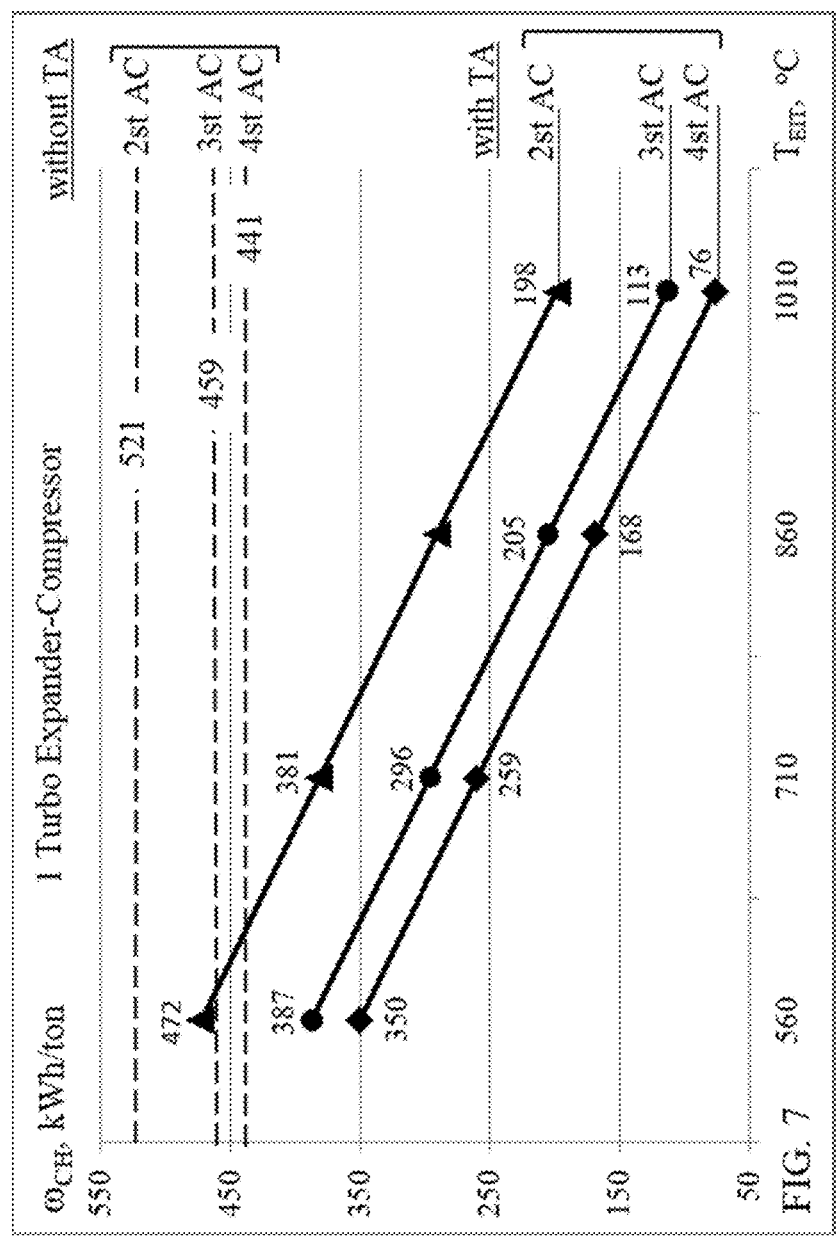
FIG. 7 is a diagram showing a relationship between a specific charge power consumed by the compressor train with one turbo expander-compressor auto-refrigeration cycle, an expander inlet temperature and a number of train stages.

The schematic view of the third embodiment for implementing the invented method of the thermally assisted electric energy storage (TAEES) in discharge operation mode is presented in the FIG. 2 and includes the following equipment packages:

300—the liquefaction, separation and storage equipment
500—the co-located source of assistant thermal energy
700—the main discharge power production block
800—the auxiliary discharge power production block.

Operation of the TAEES facility in discharge cycle mode is performed as follows. A stream 317 of liquid air is extracted at a bottom cycle pressure from the storage 316 and pumped by a pump 318 up to a top cycle pressure. A said top pressure is selected in the range between 60 and 200 bar. At this pressure the stream 319 of liquid air is delivered to air re-gasifier 701, wherein the liquid air regasification process is supplemented by some preheating a regasified air. A further increase in regasified air temperature is performed in the superheater 702 at the sacrifice of heat exchange with a heat carrier stream delivered from a co-located source of assistant thermal energy 500 through a pipe 707 and returned into source 500 through a pipe 708. Before entering the superheater 702 a temperature of heat carrier may be increased from a moderate up to a required higher level (not shown in the drawing). A superheated regasified air is further expanded in the first stage 703 of the air expander train comprising at least two stages (703 and 705) and electric generator 706, which converts a mechanical work of expanded air into electric power. A modernized back-pressure steam turbine may be used as the first (high-pressure) stage of air expander, therefore at any temperature of heat carrier incoming from the source 500 a control valve 712 should be adjusted so that a temperature of superheated regasified air at the inlet of expander 703 does not exceed 500-600° C. The regasified air partially expanded in the expander 703 down to 25-45 bar is further reheated in the reheater 704 up to the top cycle temperature. For these purposes a thermal energy of heat carrier incoming from an external source 500 through a pipe 709 and exhausting through a pipe 710 is used. A final expanding of reheated regasified air down to near atmospheric pressure is performed in the second (low-pressure) stage 705 of air expander train and accompanied by some cooling a stream 711 escaping the LP stage of expander. An industrial expander or conventional gas turbine may be used as the second (low-pressure) air expander 705. Its operation is possible as uncooled turbomachinery at the inlet air temperature not exceeding 1000° C. Operation of LP air expander at the higher values of inlet air temperature calls for usage of turbomachinery with a more complicated and expensive cooled design of rotor blading. But at any temperature a regasified air escaping the expander train possesses a sufficient thermal energy to be used in the regasifier 701 for the said liquid air regasifying and regasified air preheating, completing in such a manner the main discharge cycle.

A stream 801 of the air coming from the regasifier 701 at near atmospheric pressure is deeply cooled, resulting from heat exchange with the liquid air being regasified. This air is further repeatedly and highly efficiently used in the auxiliary discharge cycle. This is because a work of so-called "cold" compressor pressurizing the air at a cryogenic inlet temperature is drastically reduced, as compared to the compression of air at the normal inlet temperature. In addition, since the repeatedly used air is free from $H_2O$ and $CO_2$ components, any its pretreatment is not required. A repeatedly used air is pressurized in the one-stage compressor 802 up to top pressure of 5-15 bar of the auxiliary discharge cycle and delivered into a recuperator 803 for its preheating at the sacrifice of waste heat of auxiliary cycle. A temperature of preheated repeatedly used air is further increased in the auxiliary superheater 804, wherein an assistant thermal energy of heat carrier stream 710 escaping the main superheater 704 of regasified air is used for superheating a repeatedly used process air up to top temperature of the auxiliary discharge cycle. Expanding a superheated repeatedly used air in the air expander 805 down to the bottom near-atmospheric pressure is accompanied by fulfillment of a work, which after deduction of compressor 802 work is converted by the generator 806 into an additional power of the said auxiliary discharge cycle. This additional power is in the range from 10 to 20% of the power of main discharge cycle. The expanded repeatedly used air is directed to the said recuperator 803. Here its thermal energy is used for said preheating a pressurized repeatedly used air coming from compressor 802. A heat transfer between two streams of repeatedly used air leads to cooling the stream 807 escaping the recuperator 803 before its exhaust into atmosphere.

INDUSTRIAL APPLICABILITY

The performances of Thermally Assisted Electric Energy Storage (TAEES) facility using the proposed method of operation are presented below. The calculation of these performances has been performed for the case of a possible integration between a 5-10 MW TAEES facility and co-located thermal energy source with available outgoing stream of a waste heat carrier at a moderate temperature in the range between 300 and 600° C. It is assumed that a said temperature level may be if needed enhanced at the TAEES inlet up to a required higher value selected in the range up to 1010° C. Such enhancement may be performed both in the TAEES charge and discharge modes, or only in one of the said modes, thereby the selected high temperatures of heat carrier streams may be both identical and different during TAEES charge and discharge.

In the conducted feasibility study the TAEES facility is equipped with the equipment making possible to realize one or two turbo expander-compressor (1 TC or 2 TC) based open air auto-refrigeration cycle during charge period and to recover an obtained assistant thermal energy during TAEES charge and discharge. The intercooled air compressor train has from two to four stages (2 st AC-4 st AC) placed on the common shaft with the recirculating air expander and electric motor. The TAEES facility is also equipped with the equipment for fulfillment of the main and auxiliary discharge cycles.

The given and assumed technical data used in numerical simulation of the TAEES facility performance are listed in the Table 1 below.

TABLE 1

| Parameter | Unit | Data |
|---|---|---|
| TAEES facility discharge power at the identical number of charge and discharge hours | MW | 5-10 |
| Number of intercooled air compressor train stages (st AC) | | 2-4 |
| Total compressor polytropic & mechanical efficiency | % | 87 |
| Total expander adiabatic & mechanical efficiency | % | 87 |
| Total coupling & electric motor efficiency of turbomachinery | % | 97.5 |
| Number of turbo expander-compressors (TC) | | 1-2 |
| Isentropic liquid air expander efficiency | % | 85 |
| Isentropic liquid air pump efficiency | % | 80 |
| Small generator/motor efficiency | % | 96 |
| Compressor train intermediate pressure (for 2TC/1TC cycles) | barA | 34.5/39.6 |
| Top auto-refrigeration cycle pressure (for 2TC/1TC cycles) | barA | 61.7 |
| Bottom auto-refrigeration cycle pressure (for 2TC/1TC cycles) | barA | 6.7 |
| Inlet temperature of heat carrier during LAES charge/discharge | ° C. | 560-1010 |
| Pumping pressure of liquid discharged air | barA | 150 |
| Assumed pressure drop in piping | barA | 0 |
| Assumed pressure drop in each heat exchanger | barA | 0.025 |
| Discharged regasified air pressure at HP expander outlet | barA | 43 |
| Repeatedly used air pressure at compressor outlet | barA | 11 |

In their turn, the calculated performance resulted from numerical simulation of the TAEES facility charge are presented in the Table 2 and FIG. 3-7 for operation of facility with 2 st-4 st air compression stages and two and one turbo expander-compressors (TC) in the air compression, refrigeration and liquefaction cycle. Here the following designations are used: Xst AC—a number of stages in the intercooled compressor train, wherein X=2, 3 and 4; $T_{EIT}$— recirculating air expander inlet temperature during TAEES charge without enhancement (350° C. and 560° C.) and after enhancement (710-1010° C.) of assistant thermal energy;

TABLE 2

| Xst AC X = 2-4 | $T_{EIT}$, °C. | $G_{PA}$, kg/s | $G_{LA}$, kg/s | $W_{AC-CH}$, kWm | $W_{AE-CH}$, kWm | $W_{AE-CH}/W_{AC-CH}$, % | $W_{CH}$, kWe | $\omega_{CH}$, kWh/ton | $Q_{TH-CH}$, kWth |
|---|---|---|---|---|---|---|---|---|---|
| \multicolumn{10}{c}{Two turbo expander-compressors auto-refrigeration cycle} |
| 4st AC | 350 | 48.0 | 8.9 | 20341 | 8750 | 43.0 | 11837 | 369 | 8897 |
|  | 560 | 48.0 | 8.9 | 20341 | 11853 | 58.3 | 8654 | 270 | 12003 |
|  | 710 | 48.0 | 8.9 | 20341 | 14097 | 69.3 | 6353 | 198 | 14249 |
|  | 860 | 48.0 | 8.9 | 20341 | 16364 | 80.4 | 4028 | 126 | 16519 |
|  | 1010 | 48.0 | 8.9 | 20341 | 18648 | 91.7 | 1685 | 53 | 18805 |
| 3st AC | 560 | 48.0 | 8.9 | 21254 | 11853 | 55.8 | 9591 | 299 | 12003 |
|  | 710 | 48.0 | 8.9 | 21254 | 14097 | 66.3 | 7289 | 228 | 14249 |
|  | 860 | 48.0 | 8.9 | 21254 | 16364 | 77.0 | 4964 | 155 | 16519 |
|  | 1010 | 48.0 | 8.9 | 21254 | 18648 | 87.7 | 2622 | 82 | 18805 |
| 2st AC | 560 | 48.0 | 8.9 | 23372 | 11853 | 50.7 | 11763 | 367 | 12003 |
|  | 710 | 48.0 | 8.9 | 23372 | 14097 | 60.3 | 9462 | 295 | 14249 |
|  | 860 | 48.0 | 8.9 | 23372 | 16364 | 70.0 | 7137 | 223 | 16519 |
|  | 1010 | 48.0 | 8.9 | 23372 | 18648 | 79.8 | 4794 | 150 | 18805 |
| \multicolumn{10}{c}{One turbo expander-compressor auto-refrigeration cycle} |
| 4st AC | 560 | 48.0 | 7.3 | 21207 | 12207 | 57.6 | 9191 | 350 | 12371 |
|  | 710 | 48.0 | 7.3 | 21207 | 14524 | 68.5 | 6814 | 259 | 14689 |
|  | 860 | 48.0 | 7.3 | 21207 | 16865 | 79.5 | 4413 | 168 | 17033 |
|  | 1010 | 48.0 | 7.3 | 21207 | 19224 | 90.6 | 1994 | 76 | 19395 |
| 3st AC | 560 | 48.0 | 7.3 | 22156 | 12207 | 55.1 | 10164 | 387 | 12371 |
|  | 710 | 48.0 | 7.3 | 22156 | 14524 | 65.6 | 7788 | 296 | 14689 |
|  | 860 | 48.0 | 7.3 | 22156 | 16865 | 76.1 | 5387 | 205 | 17033 |
|  | 1010 | 48.0 | 7.3 | 22156 | 19224 | 86.8 | 2967 | 113 | 19395 |
| 2st AC | 560 | 48.0 | 7.3 | 24331 | 12207 | 50.2 | 12394 | 472 | 12371 |
|  | 710 | 48.0 | 7.3 | 24331 | 14524 | 59.7 | 10018 | 381 | 14689 |
|  | 860 | 48.0 | 7.3 | 24331 | 16865 | 69.3 | 7617 | 290 | 17033 |
|  | 1010 | 48.0 | 7.3 | 24331 | 19224 | 79.0 | 5197 | 198 | 19395 |

$G_{PA}$ and $G_{LA}$—flow-rates of process and liquid air; $W_{AC-CH}$ and $W_{AE-CH}$—mechanical power consumed by compressor train and self-produced by recirculating air expander; $W_{CH}=W_{AC-CH}-W_{AE-CH}$—resulting power consumed by the TAEES facility during its charge; $\omega_{CH}=W_{CH}/(G_{LA}\times 3.6)$—specific charge power consumed by the TAEES facility during its charge; and $Q_{TH-CH}$—assistant thermal energy input during TAEES charge.

Figure 8:
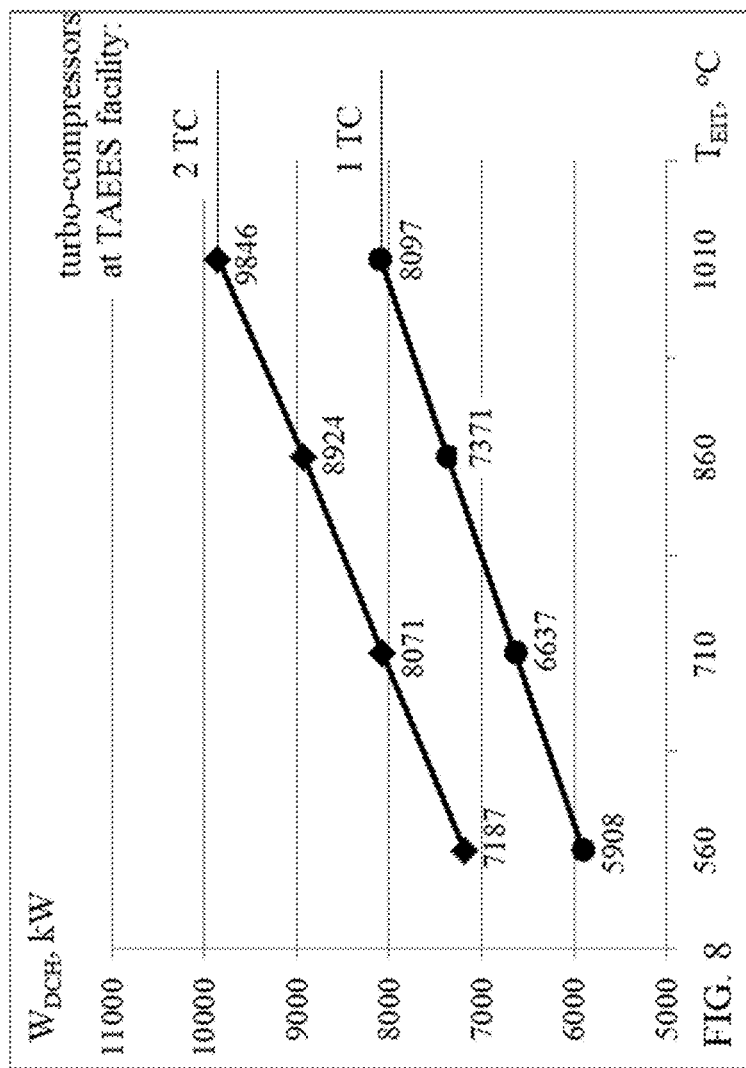
FIG. 8 is a diagram showing a relationship between a total discharge power produced by the TAEES facility, an expander inlet temperature and a number of turbo expander-compressors in auto-refrigeration cycle.

The calculated performance resulted from numerical simulation of the TAEES facility discharge are further presented in the Table 3 and FIG. 8 with regard to different amounts of liquid air produced during TAEES charge using two and one turbo expander-compressors (TC). Here the following designations are used: $T_{EIT}$—regasified air expander inlet temperature during TAEES discharge without enhancement (350° C. and 560° C.) and after enhancement (710-1010° C.) of assistant thermal energy; $G_{LA}$—flow-rate of liquid process air; $W1_{AE-DCH}$ and $W2_{AE-DCH}$—mechanical power produced by the HP and LP regasified air expanders in the main discharge cycle; $W_{AC-DCH}$—mechanical power consumed by repeatedly used air compressor of auxiliary discharge cycle; $W3_{AE-DCH}$—mechanical power produced by the repeatedly used air expander in the auxiliary discharge cycle; $W_{DCH}$—total electric power produced by the TAEES facility during its discharge; $\lambda_{ADD}=(W3_{AE-DCH}-W_{AC-DCH})/(W1_{AE-DCH}+W2_{AE-DCH})$—a ratio between the power of an auxiliary and main discharge cycles; and $Q_{TH-DCH}$—assistant thermal energy input during TAEES discharge.

TABLE 3

| $T_{EIT}$, °C. | $G_{LA}$, kg/s | $W1_{AE-DCH}$, kWm | $W2_{AE-DCH}$, kWm | $W_{AC-DCH}$, kWm | $W3_{AE-DCH}$, kWm | $W_{DCH}$, kWe | $\lambda_{ADD}$, % | $Q_{TC-DCH}$, kWth |
|---|---|---|---|---|---|---|---|---|
| \multicolumn{9}{c}{for TAES with two turbo expander-compressors cycle} |
| 350 | 8.9 | 1432 | 3192 | 726 | 1282 | 5051 | 12.0 | 8560 |
| 560 | 8.9 | 2004 | 4338 | 1250 | 2476 | 7187 | 19.3 | 10423 |
| 710 | 8.9 | 2013 | 5171 | 1250 | 2541 | 8071 | 18.0 | 11329 |
| 860 | 8.9 | 2000 | 6016 | 1250 | 2584 | 8924 | 16.6 | 12205 |
| 1010 | 8.9 | 2012 | 6871 | 1250 | 2663 | 9846 | 15.9 | 13151 |
| \multicolumn{9}{c}{for TAES with one turbo expander-compressor cycle} |
| 560 | 7.3 | 1646 | 3558 | 1025 | 2043 | 5908 | 19.6 | 8564 |
| 710 | 7.3 | 1652 | 4241 | 1025 | 2102 | 6637 | 18.3 | 9312 |
| 860 | 7.3 | 1653 | 4935 | 1025 | 2159 | 7371 | 17.2 | 10063 |
| 1010 | 7.3 | 1646 | 5636 | 1025 | 2210 | 8097 | 16.3 | 10807 |

Figure 9:
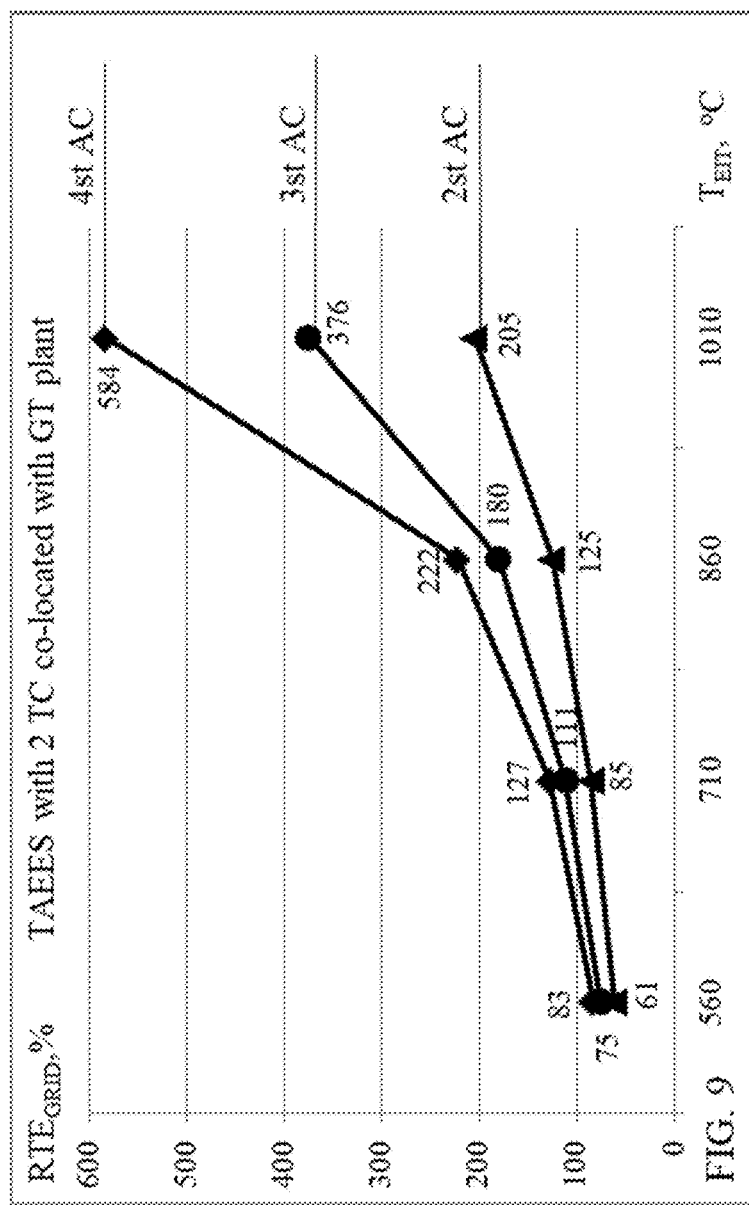
FIG. 9 is a diagram showing a relationship between a grid round-trip efficiency of the TAEES facility with two turbo expander-compressor auto-refrigeration cycle, an expander inlet temperature and a number of compressor train stages.
Figure 10:
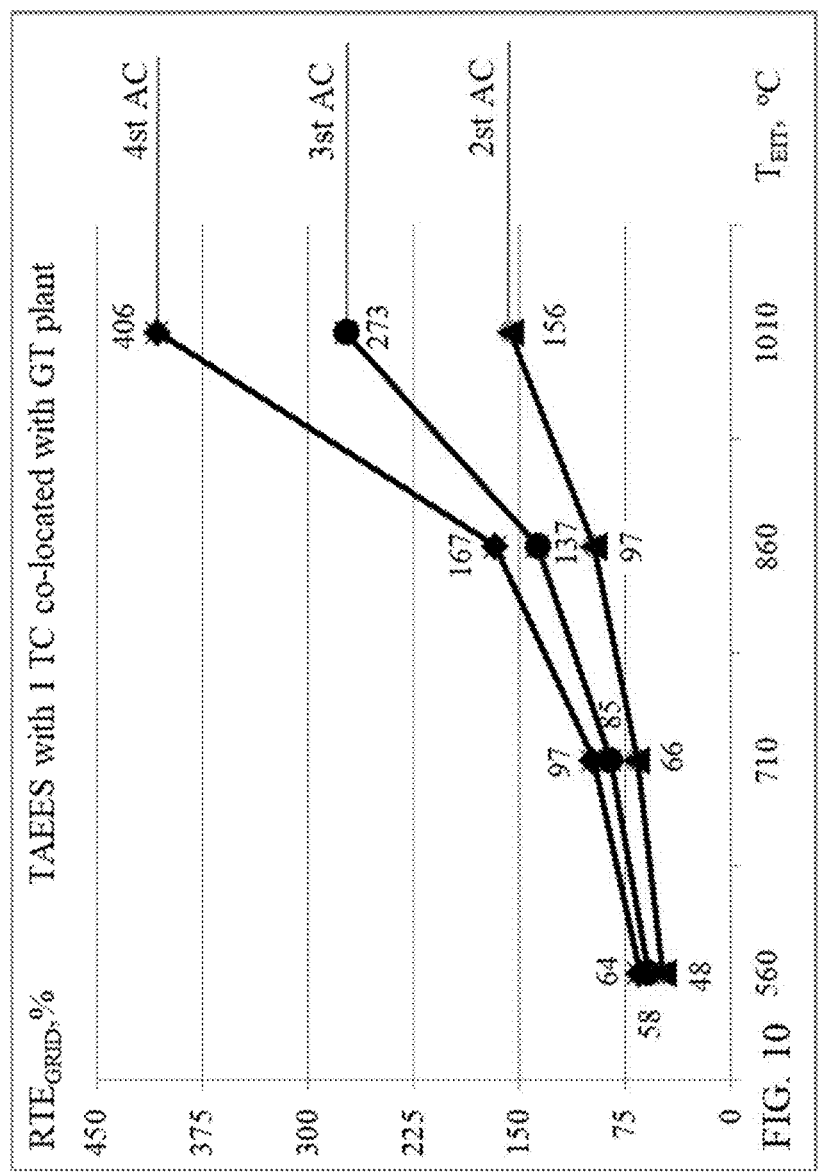
FIG. 10 is a diagram showing a relationship between a grid round-trip efficiency of the TAEES facility with one turbo expander-compressor auto-refrigeration cycle, an expander inlet temperature and a number of compressor train stages.

The resulting performance of the TAEES facility derived from its calculated performance in the charge and discharge modes is presented in the Table 4 and FIG. 9-10, as applied to the TAEES facility which may be equipped with 2 or 3 or 4 stage intercooled compression train and 1 or 2 turbo expander-compressors and supplied with the exhaust gas stream from the co-located simple cycle gas turbine plant at the moderate temperature of 560° C. in the charge and discharge TAEES operation modes. A said temperature level may be enhanced up to 710-1010° C., resulting in a drastic increase in the TAEES grid round trip efficiency (RTE) values, which are presented using the following designations: $RTE_{GRID}=W_{DCH}/W_{CH}$, where $W_{DCH}$—a total electric power delivered by the TAEES facility to the grid during facility discharge and $W_{CH}$—a resulting electric power consumed by the TAEES facility from the grid during facility charge.

TABLE 4

TAEES $RTE_{GRID} = W_{DCH}/W_{CH}$, %

| $T_{EIT}$, | 2 Turbo Expander-Compressors | | | 1 Turbo Expander-Compressor | | |
|---|---|---|---|---|---|---|
| ° C. | 4st AC | 3st AC | 2st AC | 4st AC | 3st AC | 2st AC |
| 560 | 83 | 75 | 61 | 64 | 58 | 48 |
| 710 | 127 | 111 | 85 | 97 | 85 | 66 |
| 860 | 222 | 180 | 125 | 167 | 137 | 97 |
| 1010 | 584 | 376 | 205 | 406 | 273 | 156 |

Figure 11:
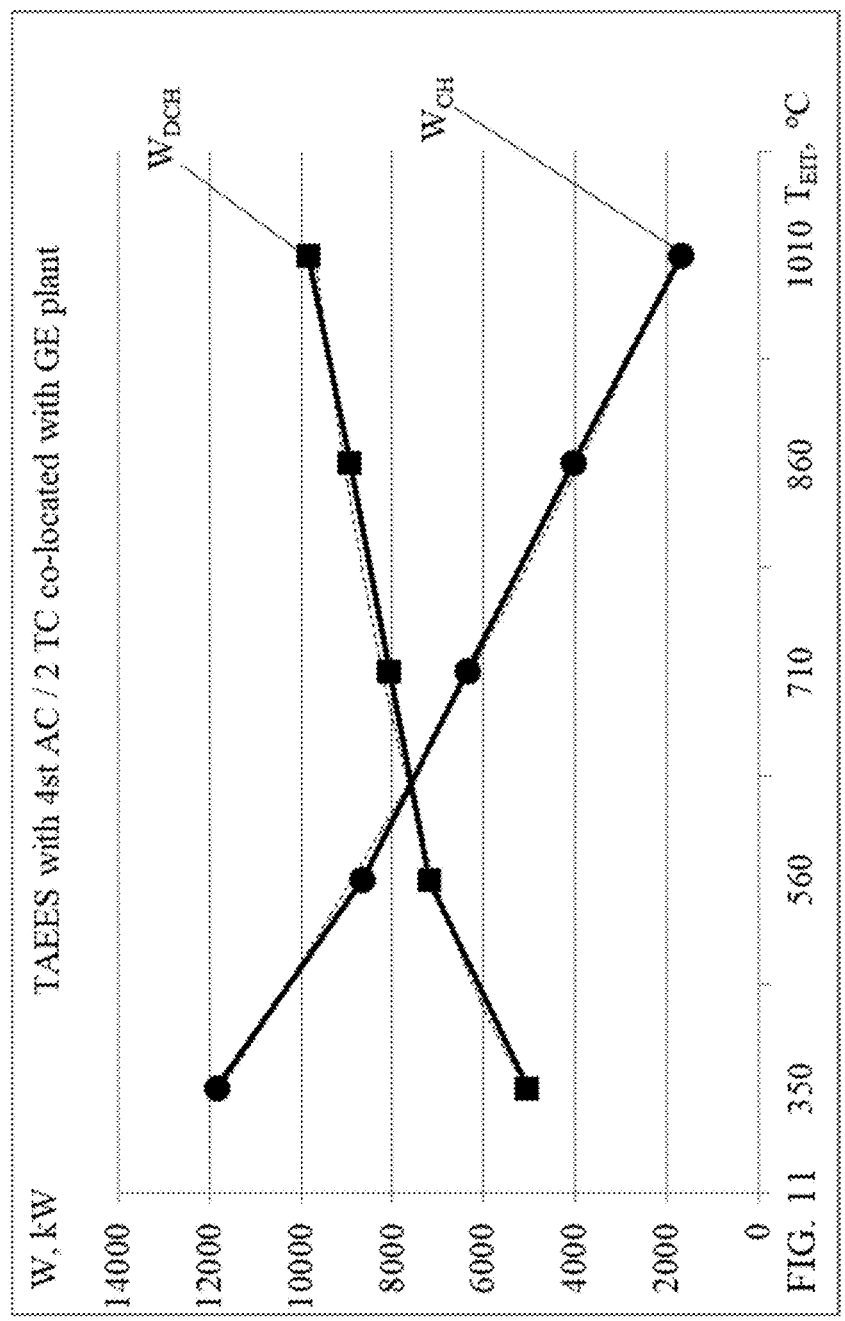
FIG. 11 is a diagram showing a total discharge power produced by the TAEES facility and charge power consumed by the facility vs. an expander inlet temperature for one of the TAEES design configurations.

However, in the case of TAEES facility its $RTE_{GRID}$ value defines quantitatively the TAEES interplay solely with the grid and does not take into consideration the quantity, temperature level and energy value of assistant thermal energy flow obtained from the co-located energy source and means for enhancement of temperature level of this energy flow. To give a total quantitative assessment of the said interplay between the TAEES facility, electrical grid and co-located sources of assistant thermal energy it is suggested to use a so-called facility recasted round trip efficiency ($RTE_{REC}$). A procedure of its determination is described below as applied to the TAEES facility which may be co-located with a simple cycle power plant, using as an example the reciprocating prime mover being in service during the TAEES charge and discharge. It is assumed that TAEES facility is equipped with 4 stage intercooled compression train and 2 turbo expander-compressors and uses the exhaust gas stream of the co-located plant providing a moderate air expander inlet temperature of 350° C. A said air temperature level at the expander inlet may be enhanced up to 560-1010° C. during TAEES facility charge and/or discharge, resulting in an impressive decreasing the resulting charge power $W_{CH}$ and increasing the resulting discharge power $W_{DCH}$ (see FIG. 11). In so doing, there is a need to take into account the following circumstances.

Firstly, the simplest way for increase in air expander inlet temperature is an increase in temperature of waste heat carrier through combustion of any available fuel and above all of excessive fuel from the national natural gas grid. Such excess of fuel at a frequently reduced price occurs during the off-peak hours in the electrical grid, which are usually chosen for energy storage charge. Secondly, as is evident from the FIG. 11, a drop in resulting power consumed during TAEES charge ($W_{CH}$) due to the increase in air expander inlet temperature from 350 up to 1010° C. exceeds an alternative rise in total power produced during TAES discharge ($W_{DCH}$) more than three and half times. However the need for immediate enhancement of the heat carrier temperature during TAEES charge does not exclude a possibility and expediency of the similar temperature enhancement during TAEES discharge or simultaneously during TAEES charge and discharge.

At the same time consideration must be given to the different results from such enhancement in air expander inlet temperature. As will be shown below, during TAEES charge it leads to an impressive increase in $RTE_{REC}$ value without any changes in the $W_{DCH}$ values, whereas during TAEES discharge it makes possible to reach a less significant enhancement of $RTE_{REC}$ value but with simultaneous and marked increase in the $W_{DCH}$ value. The greatest increase in the $RTE_{REC}$ value with a said simultaneous increase in its $W_{DCH}$ value may be obtained from concurrent use of the recirculating and regasified air at the enhanced temperatures during TAEES charge and discharge. Finally, there is a need for assessment of the energy value of fuel being used for increase in temperature of supplied heat carrier accompanied by production of an additional power in the charge and discharge cycles. In so doing, account must be taken of the average efficiency ($\eta_{GRID}$) of converting the fuel into power in the grid which is currently estimated at $\eta_{GRID}$—31% with regard to losses of this power in the grid. The said additional power should be added to the calculated $W_{CH}$ value, if fuel is used for increase in heat carrier temperature during TAEES charge and subtracted from the calculated $W_{DCH}$ value, if fuel is used for increase in heat carrier temperature during TAEES discharge.

Figure 12:
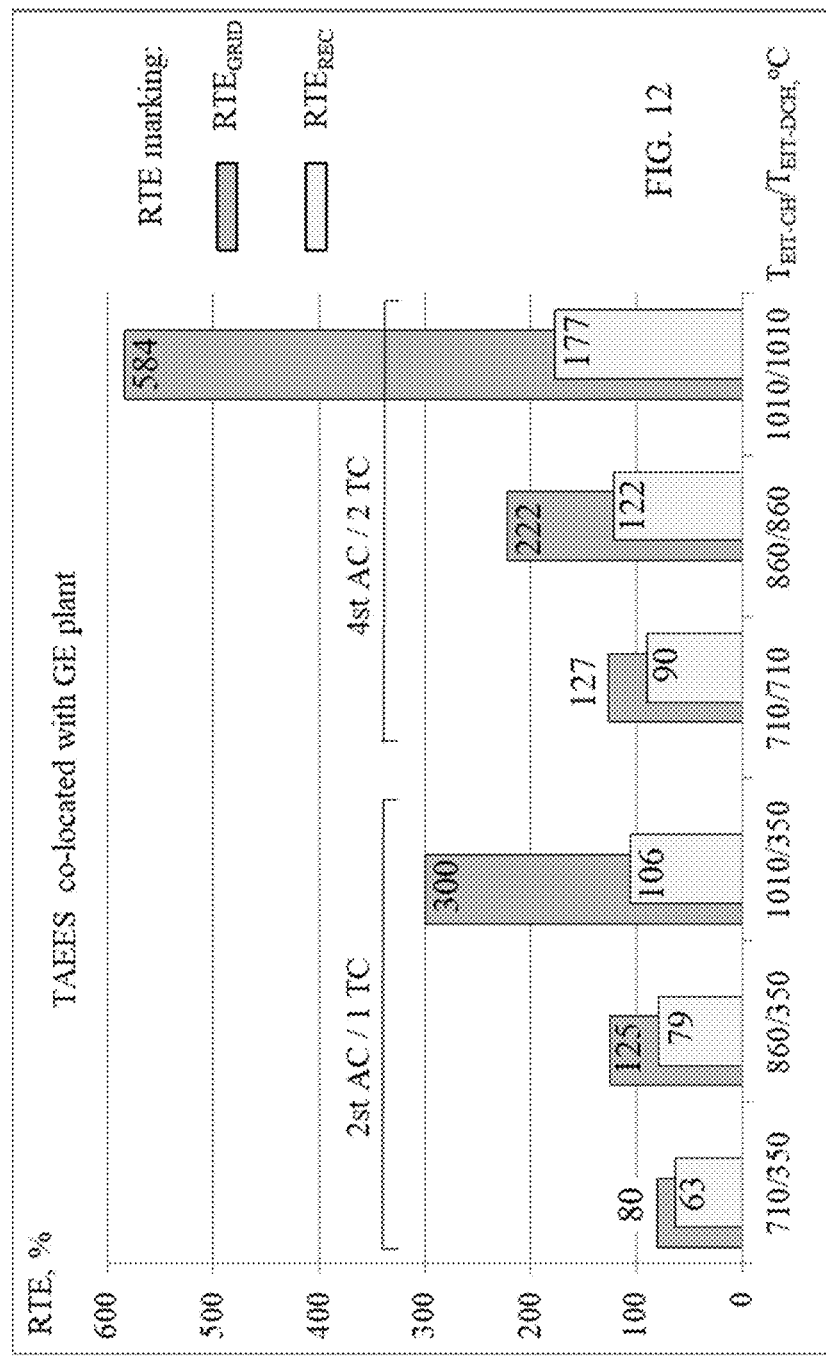
FIG. 12 is a diagram showing the impact of expander inlet temperature during TAEES facility charge and discharge on the grid and recasted round-trip efficiencies of the facilities co-located with gas engine plant and having two different design configurations.

The dependence of the grid and recasted RTE values on the expander inlet temperatures are graphically presented in the FIG. 12 for two selected cases of operating the TAEES facility co-located with gas engine plant. In the first case during TAEES facility discharge a waste heat carrier is delivered without any enhancement in its temperature, resulting in regasified air expander inlet temperature of $T_{EIT-DCH}=350°$ C. During TAEES facility charge a temperature of waste heat carrier is enhanced, resulting in recirculating air expander inlet temperature of $T_{EIT-CH}=710-1010°$ C. In the second case an enhancement of waste heat carrier temperature is performed both during facility charge and discharge and in such a way that the temperature equality $T_{EIT-CH}=T_{EIT-DCH}$ is provided in the range from 710° C. to 1010° C. As shown in the FIG. 12, the recasted values of round trip efficiency ($RTE_{REC}$) are significantly less than its grid values ($RTE_{GRID}$) especially in the region of the high expander inlet temperatures. Nevertheless, an increase in these temperatures makes possible to provide a significant enhancement of the $RTE_{REC}$ values even with the use of the elevated temperatures only during TAEES charge. A further drastic increase in the $RTE_{REC}$ values may be achieved using the elevated expander inlet temperatures during TAEES charge and discharge alike. By and large the presented data testify the technical and economic expedience of integrating the LAES and co-located gas engine plant into the TAEES facility.

The even greater benefits may be derived from integration of the TAEES facility with any other thermal energy source having a higher initial temperature of waste heat carrier, such as a simple cycle gas turbine. Resulting from a higher temperature of gas turbine exhaust assumed at a level of 570° C., a lesser difference in $RTE_{GRID}$ and $RTE_{REC}$ values may be obtained as the waste heat carrier temperature further enhances. In its turn this results in the greater values of the $RTE_{REC}$ in all cases of the enhanced heat carrier temperature usage. For example, as evident from the Table 5 and FIG. 13 co-location with the gas turbine plant and enhancement of expander inlet temperature from 560° C. up to 860° C. during TAEES charge and discharge provides the TAEES $RTE_{REC}$ value at a level of 154%, whereas co-location with the gas engine plant and enhancement of expander inlet temperature from 350° C. up to the same value of 860° C. makes possible to reach $RTE_{REC}$ value of 122% only (see FIG. 12). A general grasp of the variety of achievable RTErec values for the TAEES facility co-located with the gas turbine plant at the different combinations of expander inlet temperatures during TAEES charge and discharge can be gained from the Table 5 and FIG. 13.

Figure 13:
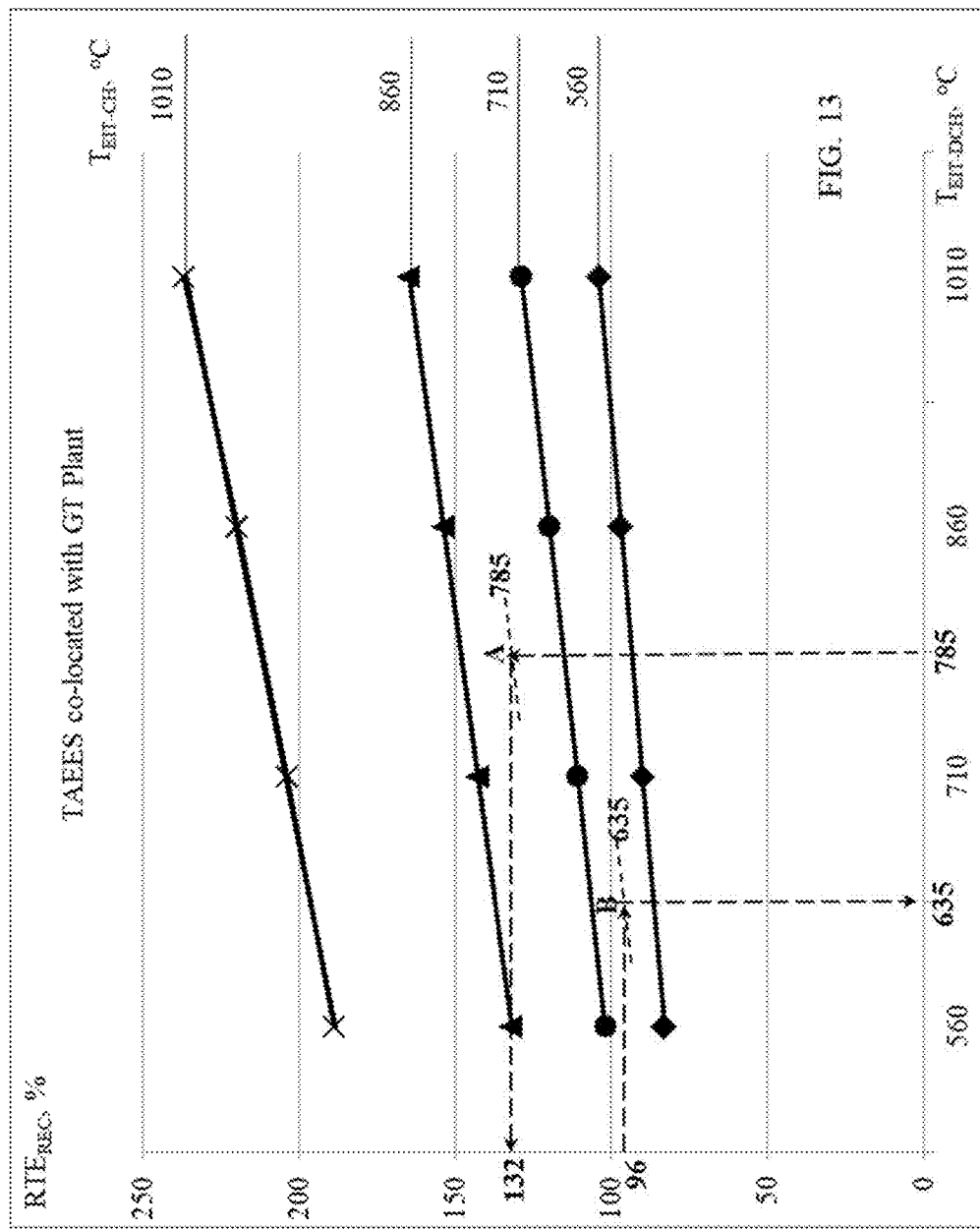
FIG. 13 is a diagram showing the impact of expander inlet temperature during TAEES facility charge and discharge on the recasted round-trip efficiency of the facility co-located with gas turbine plant and having one selected design configuration.

The Table 5 and FIG. 13 make possible to determine any resulting TAEES $RTE_{REC}$ value for the selected combination of the expander inlet temperatures during facility charge and discharge and given configuration of the TAEES facility co-located with GT plant. For example, TAEES facility using the common expander inlet temperatures $T_{EIT-CH}=T_{EIT-DCH}=785°$ C. during facility charge and discharge (see point A in FIG. 13) will have $RTE_{REC}=132\%$. On the other hand, the same Table 5 and FIG. 13 make possible to determine the required expander inlet temperature in any TAEES process (charge or discharge) to reach a given value of the facility $RTE_{REC}$ at a given expander inlet temperature in another TAEES process (discharge or charge). For example, for the given $RTE_{REC}$ value of 96% and at the $T_{EIT-CH}=635°$ C. of recirculating air expander inlet temperature in the charge process (see point B in FIG. 13) the discharge process at the TAEES facility should be conducted at the same temperature of $T_{EIT-DCH}=635°$ C. at the inlet of regasified air expander.

TABLE 5

$RTE_{REC}$ values of the TAEES facility

| $T_{EIT-CH}$, ° C. | $T_{EIT-DCH}$, ° C. | | | |
|---|---|---|---|---|
|  | 1010 | 860 | 710 | 560 |
| 1010 | 237 | 220 | 204 | 189 |
| 860 | 165 | 154 | 143 | 132 |
| 710 | 129 | 120 | 111 | 102 |
| 560 | 104 | 97 | 90 | 83 | inlet temperature (see point B) the discharge process at the TAEES facility should be conducted at the same temperature of $T_{EIT-DCH}=635°$ C. at the inlet of regasified air expander.

It should be noted that the term "comprising" does not exclude other elements or steps and "a" or "an" do not exclude a plurality. It should also be noted that reference signs in the claims should not apparent to one of skill in the art that many changes and modifications can be effected to the above embodiments while remaining within the spirit and scope of the present invention. For example, a thermally assisted process of air liquefaction described in the present invention could be applied to the air separation and liquefaction of the different gases, including ASU technique and LNG production plants.

What is claimed as new is:

1. A method for thermally assisted electric energy storage (TAEES), comprising in combination:
   pressurizing a process air, as a sum of fresh and recirculating air streams, up to an intermediate pressure with use of mechanically or electrically driven intercooled compressor train consuming an external power during TAEES charge;
   succeeding TAEES operation using the principle of at least one turbo expander-compressor based open air auto-refrigeration cycle and including:
   a) compressing the process air up to a top cycle pressure by the boost compressor;
   b) pre-cooling the entire process air;
   c) work-expanding the most part of pre-cooled process air down to a bottom cycle pressure and a corresponding its deep cooling;
   d) harnessing an expansion work for driving the said boost compressor;
   e) liquefying the rest of process air at a top cycle pressure and its expanding with a final cooling down to the bottom cycle pressure and temperature;
   f) separating the liquid and gaseous phases of the rest of process air;
   g) forming a recirculating air stream at a bottom cycle pressure as a mixture of the deeply-cooled most part of process air and a gaseous phase of the rest of process air;
   h) further sequential using a cold thermal energy of recirculating air for liquefying the rest of process air and pre-cooling the entire process air;
   storing the liquid air between the TAEES charge and discharge;
   performing the main TAESS discharge cycle through pumping the liquid air, its re-gasifying, further superheating at a sacrifice of an assistant thermal energy and expanding with producing the main discharge power;
   producing an additional discharge power in the auxiliary TAEES discharge cycle with use of the assistant thermal energy and a cold thermal energy released during the liquid air re-gasifying; and
   wherein in combination:
   a bottom pressure of said open air auto-refrigeration cycle is selected at a level exceeding atmospheric pressure by 1-10 bar and preferably by 3-8 bar;
   a recirculating air escaping the pre-cooler of process air is superheated with use of an assistant thermal energy delivered during TAEES charge in the amount of 100-300% of such energy delivered during TAEES discharge;
   a superheated recirculating air is further expanded down to near-atmospheric pressure with self-producing a power used for driving a compressor train and for decreasing the consumption of external charge power at least by 40%; and
   a said liquid air being pumped, re-gasified, heated and expanded in the main TAEES discharge cycle is further and repeatedly used as a working medium for producing a said additional discharge power in the auxiliary TAEES discharge cycle.

2. The method as in claim 1, wherein:
   an assistant thermal energy comprises at least a waste heat delivered from the co-located power generation or industrial facilities at a temperature of heat carrier exceeding 300° C. and preferably above 500° C.;
   the said co-located power generation or industrial facilities are selected from a group of facilities being operated during TAEES charge and discharge and exemplified but not limited by the simple cycle turbocharged reciprocating engine or gas turbine-based power plants, industrial heaters, furnaces, driers and other facilities with the gaseous and liquid waste heat streams, as well as by the concentrated solar power plants;
   a high temperature part of assistant thermal energy is added to a said waste heat part, aiming to increase a temperature of waste heat carrier from its said moderate level up to a selected higher value not exceeding 1000° C.; and adding a high temperature part of assistant thermal energy to waste heat stream is performed by deriving this energy from combustion of any available renewable or fossil fuels.

3. The method as in claim 1, wherein a designed amount of self-produced power in the TAEES charge cycle is provided through selecting a number of the stages of inter-cooled compressor train and a number of the turbo expander-compressors in the open air auto-refrigeration cycle, as well as through selecting a bottom pressure of said cycle, flow-rate and a temperature of heat carrier delivering a said assistant thermal energy to the TAEES facility.

4. The method as in claim 1, wherein the main TAEES discharge cycle comprises in combination:

delivering a liquid air from a storage and its pumping up to top cycle pressure selected in the range between 60 and 200 barA;

re-gasifying a liquid air through recovering a waste heat of main discharge cycle;

further superheating a re-gasified air up to the temperature selected in the range between 500 and 600° C. with use of one part of an assistant thermal energy delivered into a superheater of main TAEES discharge cycle;

a partial expanding the superheated re-gasified air down to an intermediate pressure selected in the range between 25 and 45 barA with producing a part of discharge power in the main TAEES discharge cycle;

succeeding reheating a partially expanded re-gasified air with use of another part of an assistant thermal energy delivered into a reheater of main TAEES discharge cycle;

a final expanding the reheated re-gasified air down to the near-atmospheric pressure with producing another part of discharge power in the main TAEES discharge cycle; and a said recovering a waste heat of air escaping the second expansion stage for re-gasifying a liquid air delivered from the storage with corresponding recovering a cold thermal energy of liquid air being re-gasified for deep cooling a said expanded air.

5. The method as in claim 4, wherein the said auxiliary TAEES discharge cycle comprises in combination:

compressing a deeply cooled repeatedly used air up to a pressure selected in the range between 5 and 15 barA;

preheating the compressed repeatedly used air through recovering a waste heat of auxiliary discharge cycle;

further superheating the compressed repeatedly used air through recovering the rest of another part of assistant thermal energy delivered into a superheater of auxiliary TAEES discharge cycle from said reheater of main TAEES discharge cycle;

expanding the superheated repeatedly used air down to the near-atmospheric pressure with producing an additional discharge power of the auxiliary TAEES discharge cycle; and recovering a waste heat of expanded repeatedly used air for the said preheating the compressed repeatedly used air.

* * * * *